United States Patent
Ohtake

(10) Patent No.: US 7,856,892 B2
(45) Date of Patent: Dec. 28, 2010

(54) FLOW-RATE MEASURING METHOD AND FLOW-RATE MEASURING DEVICE

(75) Inventor: Fumio Ohtake, Saitama (JP)

(73) Assignee: Surpass Industry Co, Ltd. (JP)

( * ) Notice: Subject to any disclaimer, the term of this patent is extended or adjusted under 35 U.S.C. 154(b) by 0 days.

(21) Appl. No.: 12/362,997

(22) Filed: Jan. 30, 2009

(65) Prior Publication Data

US 2009/0205441 A1 Aug. 20, 2009

(30) Foreign Application Priority Data

Feb. 14, 2008 (JP) ............................. 2008-033445

(51) Int. Cl.
*G01F 1/708* (2006.01)
(52) U.S. Cl. .................................. 73/861.95
(58) Field of Classification Search .............. 73/861.95, 73/861.05, 204.23
See application file for complete search history.

(56) References Cited

U.S. PATENT DOCUMENTS

| | | | | |
|---|---|---|---|---|
| 4,938,079 A | * | 7/1990 | Goldberg | 73/861.95 |
| 5,260,665 A | * | 11/1993 | Goldberg et al. | 324/636 |
| 6,155,112 A | * | 12/2000 | Eckert et al. | 73/290 V |
| 6,386,050 B1 | * | 5/2002 | Yin et al. | 73/861.95 |
| 6,668,663 B2 | * | 12/2003 | May et al. | 73/861.05 |
| 6,932,796 B2 | * | 8/2005 | Sage et al. | 604/250 |
| 2004/0008335 A1 | | 1/2004 | Hayes et al. | |

FOREIGN PATENT DOCUMENTS

| | | |
|---|---|---|
| DE | 10356443 A1 | 7/2005 |
| EP | 0767360 A2 | 4/1997 |
| JP | 2002-148089 A | 5/2002 |
| JP | 2004-271523 A | 9/2004 |

OTHER PUBLICATIONS

European Search Report dated Apr. 7, 2009 for European Patent Application No. 09151576.7 of Surpass Industry Co., Ltd. for a Flow-Rate Measuring Method and Method and Flow-Rate Measuring.

* cited by examiner

*Primary Examiner*—Jewel Thompson
(74) *Attorney, Agent, or Firm*—Thomas W. Tolpin; Tolpin & Partners, PC

(57) ABSTRACT

A measurable flow-rate range is increased to enhance usability. A flow-rate measuring method for measuring the flow rate of a fluid inside a tube is provided. This method uses a thermal-marker generator that heats the fluid flowing through the tube from the outside thereof to generate a thermal marker in the fluid inside the tube and a thermal-marker detector disposed downstream of the thermal-marker generator and configured to detect the thermal marker in the fluid inside the tube generated by the thermal-marker generator, so as to measure the flow rate on the basis of the distance between the thermal-marker generator and the thermal-marker detector, a time period between a point at which the thermal marker in the fluid inside the tube is generated by the thermal-marker generator and a point at which the thermal marker is detected by the thermal-marker detector, and the cross-sectional area of the tube. In this method, the thermal-marker generator heats the fluid by a microwave heating technique, and microwaves are applied to the fluid by using a microstrip line.

20 Claims, 4 Drawing Sheets

FLOW-RATE MEASURING METHOD AND FLOW-RATE MEASURING DEVICE

BACKGROUND OF THE INVENTION

1. Field of the Invention

The present invention relates to a flow-rate measuring method for measuring the flow rate of a fluid and to a flow-rate measuring device.

This application is based on Japanese Patent Application No. 2008-033445, the content of which is incorporated herein by reference.

2. Description of Related Art

In a known method for measuring the flow rate of a fluid, a portion of the fluid is intentionally given a temperature that is different from that of the rest of the fluid (this portion will be referred to as a "thermal marker" hereinafter), and a thermal-marker detecting unit monitors the movement of the thermal marker so as to measure the flow rate of the fluid (Japanese Unexamined Patent Applications, Publication Nos. 2002-148089 and 2004-271523).

In the methods disclosed in Japanese Unexamined Patent Applications, Publication Nos. 2002-148089 and 2004-271523, the thermal marker can be generated from the outside of a tube through which the fluid flows by using a heat source, such as a heater or a laser. This means that the heat source is not brought into direct contact with the fluid. Likewise, the thermal-marker detecting unit uses, for example, a laser beam as detection light for detecting a change in the absorbance of light of a specific wavelength in the fluid so that the thermal-marker detecting unit can measure the flow rate without being in direct contact with the fluid. This is advantageous in that, when measuring the flow rate, the fluid can be prevented from being contaminated as a result of coming into contact with undesirable materials.

On the other hand, although the sensitivity to a change in the absorbance of light of a specific wavelength caused by a temperature change in the fluid is satisfactory in the methods disclosed in Japanese Unexamined Patent Applications, Publication Nos. 2002-148089 and 2004-271523, the characteristics of the heat source are not satisfactory for generating a thermal marker. The reason is that, in a method where the heat source, such as an external heater, is installed in direct contact with the exterior of the tube through which the fluid flows, there is a time lag in heat transmission since the fluid itself is heated after the heat from the external heater is transmitted to the tube, thus resulting in a heated region which is undesirably wide. This spreads the pattern of the thermal marker wider than the heat source and thus leads to an increase in a flow-rate measurement error.

For solving this problem, a heating method performed by irradiating a microscopic region of the fluid with a laser beam is proposed. In such a heating method using a laser beam, a specific wavelength of the laser beam is selected, and the laser beam is transmitted through the tube through which the fluid flows, whereby the fluid can be directly heated while the heated portion of the fluid is limited to a laser-beam irradiation region thereof. In consequence, the thermal marker is prevented from over-spreading, thus preventing the flow-rate measurement accuracy from being reduced.

However, since there are no low-cost high-output lasers suitable for this purpose at present, only low-output lasers can be used under the present circumstances. Due to the low-output characteristics of these lasers, a temperature change in the fluid is limited to a low value, resulting in a limited measurable flow-rate range. Therefore, the measurable flow-rate range is limited to 10 ml/min or lower, and the difference between the upper limit and the lower limit of the measurable flow-rate range is limited to a factor of ten.

BRIEF SUMMARY OF THE INVENTION

In view of the circumstances described above, an object of the present invention is to provide a flow-rate measuring method and a flow-rate measuring device with a wider measurable flow-rate range and enhanced usability.

In order to achieve the aforementioned object, a flow-rate measuring method and a flow-rate measuring device according to the present invention employ the following solutions.

An aspect of the present invention provides a flow-rate measuring method for measuring a flow rate of a fluid inside a tube by using a heating unit that heats the fluid flowing through the tube from the outside thereof so as to generate a heated portion, acting as a thermal marker, in the fluid inside the tube and a detecting unit disposed downstream of the heating unit and configured to detect the heated portion, generated by the heating unit, of the fluid inside the tube. The flow rate is measured on the basis of a distance between the heating unit and the detecting unit, a time period between a point at which the heated portion of the fluid inside the tube is generated by the heating unit and a point at which the heated portion is detected by the detecting unit, and a cross-sectional area of the tube. In this method, the heating unit heats the fluid by a microwave heating technique, and microwaves are applied to the fluid by using a transmission line.

According to this aspect, since the heating unit intensively heats the fluid flowing through the tube using microwaves, the fluid can be heated from the outside of the tube, similar to when a laser beam is used. In addition, according to this aspect, the fluid can be heated at the interior thereof without heat absorption at the external surface thereof, which can occur when using a laser beam. Consequently, a thermal marker that provides a large temperature difference in the fluid can be generated by an output that is larger than that of the laser beam used in the related art.

Furthermore, according to this aspect, since the fluid can be intensively and locally heated by irradiating it with the microwaves by using the transmission line, a clearly distinguishable thermal marker can be generated. Thus, the thermal marker in the fluid becomes readily detectable by a detector of the detecting unit disposed downstream of the heating unit, and the heating unit and the detecting unit can be separated from each other by a greater distance. Consequently, the measurable flow-rate range can be increased.

In the above aspect, the detecting unit may detect the thermal marker on the basis of a change in absorbance of detection light at a predetermined wavelength.

Furthermore, in the above aspect, the transmission line may be a microstrip line.

With this configuration, for example, when the tube has an inner diameter of 1 mm, a microstrip line having a line width of about 2 mm to 6 mm is used so that the fluid can be irradiated with microwaves having a frequency of 2.45 GHz, commonly used in microwave ovens and microwave heating devices. In consequence, the heating unit can be reduced in size.

Alternatively, in the above aspect of the invention, the transmission line may be a coaxial line.

In a microwave heating technique, a fluid can be heated at the interior thereof. Therefore, it is also possible to increase the measurable flow-rate range by increasing the inner diameter of the tube through which the fluid flows. However, since increasing the inner diameter of the tube results in an increase in the thickness of the fluid layer, the detection light of the detecting unit for the thermal marker may be over-attenuated within the fluid. This can possibly result in an inability to transmit a sufficient intensity of detection light through the fluid.

Such being the case, in the above aspect, the tube has a partly different tubular shape at a part where the detecting unit is disposed, the partly different tubular shape being made to cause the thickness of the fluid inside the tube to decrease at a portion through which detection light of a predetermined wavelength passes, relative to a portion upstream of the portion through which the detection light of the predetermined wavelength passes.

Furthermore, the part of the tube where the detecting unit for the thermal marker is disposed may be made flat so that the detection light can enter this part of the tube in a direction orthogonal thereto. This is advantageous in that the reflection of the detection light at the tube surface can be minimized, as compared to when an ordinary cylindrical tube is used.

With this configuration, the measurable flow-rate range can be effectively increased by simply limiting the thickness of the fluid layer to a thickness just enough to transmit a sufficient intensity of detection light at a transmission point for the detection light and by using a tube with a larger diameter.

Furthermore, in the detecting unit for the thermal marker in the above aspect, a laser beam emitted from a semiconductor laser diode may be used as a source of detection light of a predetermined wavelength for the detecting unit, and a photo diode that detects a light intensity of the laser beam may be provided.

With this configuration, since laser beams have high directional properties, the range over which the thickness of the fluid layer is made to decrease can be reduced as much as possible. Consequently, the tube can have a larger inner diameter, thereby increasing the measurable flow-rate range.

Accordingly, the present invention can provide advantages in terms of a wider measurable flow-rate range and enhanced usability.

DETAILED DESCRIPTION OF THE INVENTION

First Embodiment

A flow-rate measuring method and a flow-rate measuring device according to a first embodiment of the present invention will be described below with reference to the drawings.

Figure 1:
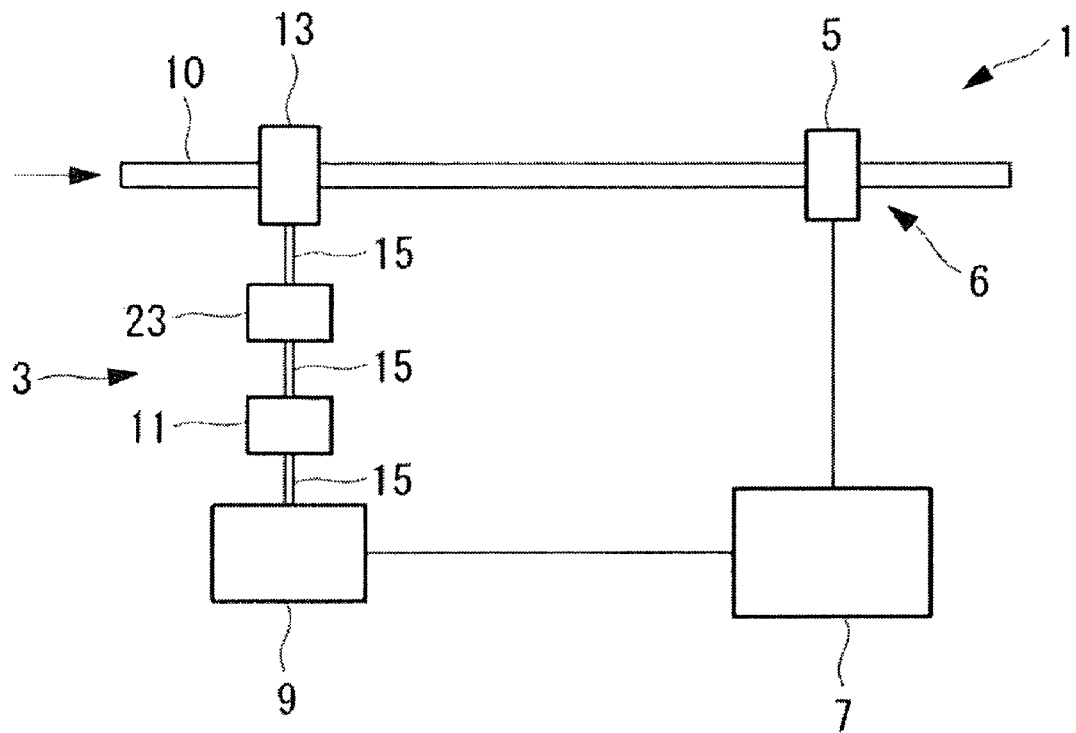
FIG. 1 is a schematic view of a flow-rate measuring device according to a first embodiment of the present invention.

Referring to FIG. 1, a flow-rate measuring device 1 according to the first embodiment includes a thermal-marker generating unit (i.e., a heating unit) 3 equipped with a thermal-marker generator 13 that gives a portion of the fluid flowing through a tube 10 a temperature different from that of the rest of the fluid, a thermal-marker detecting unit (i.e., a detecting unit) 6 equipped with a thermal-marker detector 5 that detects a thermal marker generated by the thermal-marker generator 13, and a control system 7 equipped with, for example, a microprocessor that controls the thermal-marker generating unit 3 and the thermal-marker detecting unit 6.

The flow-rate measuring device 1 is configured to measure the flow rate of the fluid flowing through the tube 10 on the basis of the distance between the thermal-marker generator 13 and the thermal-marker detector 5 (more specifically, the distance between a position where the thermal marker is generated and a position where the thermal marker is detected), the time that it takes the thermal marker generated by the thermal-marker generator 13 to reach the thermal-marker detector 5, and the cross-sectional area of the tube 10.

The thermal-marker generating unit 3 includes a microwave oscillator 9 that emits microwaves in pulses, a power amplifier 11 that amplifies the microwaves emitted from the microwave oscillator 9, an impedance matcher 23 for efficiently transmitting the microwaves amplified by the power amplifier 11 to the thermal-marker generator 13, the aforementioned thermal-marker generator 13 that heats the fluid by irradiating it with the microwaves from the outside of the tube 10 so as to generate the thermal marker, and a coaxial cable 15 that connects these components.

The microwave oscillator 9 used is, for example, a solid-state type with an output of 50 W or lower. The microwaves used are preferably within a range between 300 MHz and 30 GHz, and more preferably, have a frequency of 2.45 GHz.

Figure 2:
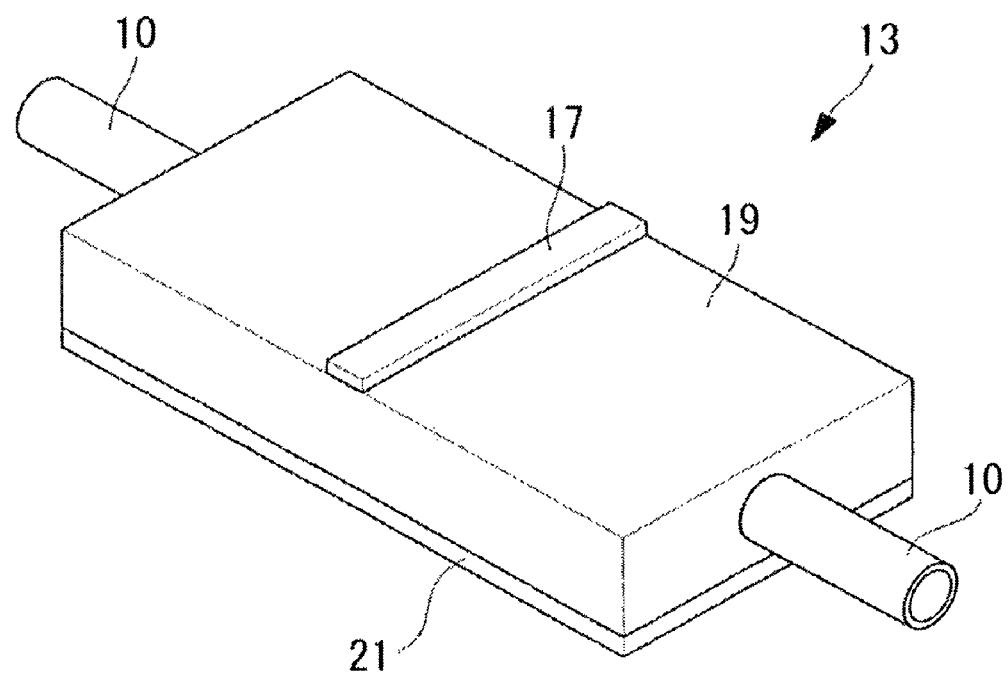
FIG. 2 is a schematic view of a thermal-marker generator of the flow-rate measuring device shown in FIG. 1.

FIG. 2 illustrates the thermal-marker generator 13 that uses a microstrip line 17 as a form of transmission line.

The thermal-marker generator 13 is configured to intensively and locally heat the fluid flowing through the tube 10 by a microwave heating technique. As shown in FIG. 2, the thermal-marker generator 13 includes the aforementioned microstrip line 17, which is a form of transmission line that transmits microwaves, a ground conductor 21, and a substantially rectangular-parallelepiped dielectric member 19 through which the tube 10 extends. The tube 10 preferably has, for example, a diameter ranging between 1 mm and 4 mm and is composed of a fluoroplastic material, such as polytetrafluoroethylene (Teflon®). The use of a fluoroplastic material, which is acid resistant and alkali resistant, is advantageous in that it allows for the use of various kinds of chemical solutions from strongly acidic to strongly alkaline kinds.

The microstrip line 17 is formed of, for example, a copper or gold plate with a line width ranging between 2 mm and 6 mm and a thickness of about several tens of μm. The microstrip line 17 is disposed on the top surface of the dielectric member 19 so as to extend above and crosswise to the tube 10. One of the two ends of the microstrip line 17 is connected to the coaxial cable 15, whereas the other end has a terminator (not shown) attached thereto. The microstrip line 17 irradiates the fluid in the tube 10 directly below the microstrip line 17 with GHz-band microwaves transmitted through the coaxial cable 15, and the microwaves are prevented from being reflected at the terminal by the terminator.

The impedance of the microstrip line 17 is determined mainly on the basis of the dielectric constant of the dielectric member 19, the thickness of the dielectric member 19, and the line width of the microstrip line 17, and is therefore set in conformity to a characteristic impedance of the coaxial cable 15. Normally, the characteristic impedance of the coaxial cable 15 is 50Ω. For example, if the tube 10 has an inner diameter of 1 mm and the dielectric member 19 is composed of a fluoroplastic material, the microstrip line 17 can be formed to have a line width of about 6 mm. If the dielectric member 19 is composed of an alumina ceramic material or a sapphire material, the microstrip line 17 can be formed to have a line width of about 2 mm.

The dielectric member 19 is not limited to a fluoroplastic material, a ceramic material, or a sapphire material, and can be composed of other insulating materials. The ground conductor 21 composed of copper or gold is provided over the entire bottom surface of the dielectric member 19.

Figure 3:
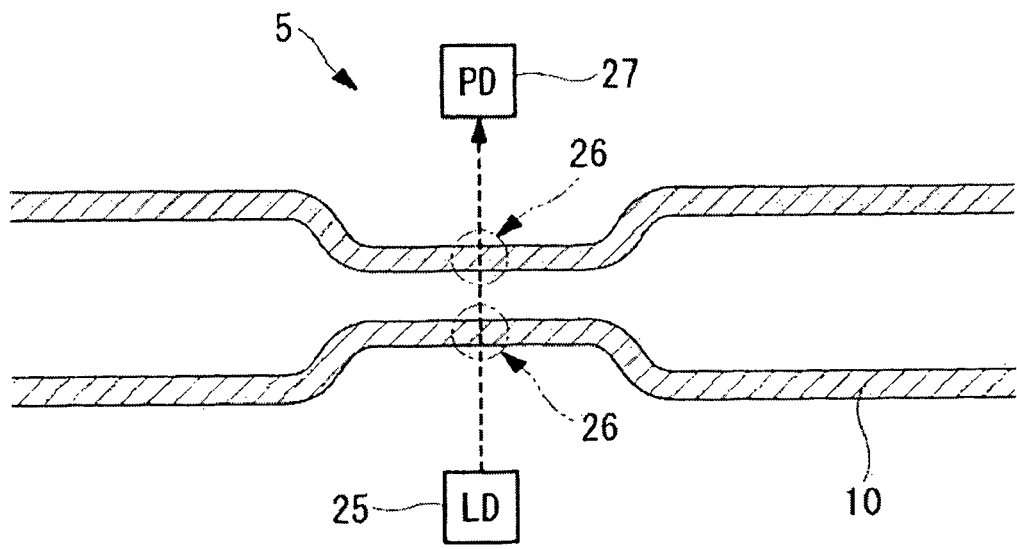
FIG. 3 is a schematic view of a thermal-marker detector of the flow-rate measuring device shown in FIG. 1.

Referring to FIG. 3, the thermal-marker detector 5 includes a semiconductor laser diode 25 that emits an infrared laser beam (simply referred to as a "laser beam" hereinafter) towards the fluid flowing through the tube 10, and a photo diode 27 that receives the laser beam passing through the fluid after being emitted from the semiconductor laser diode 25.

The thermal-marker detector 5 is disposed on the tube 10 at the downstream side of the thermal-marker generator 13 with a predetermined distance therebetween and is configured to detect a change in the absorbance of the laser beam passing through the fluid. Specifically, the thermal-marker detector 5 is disposed on the tube 10 at a position about 10 cm downstream of the thermal-marker generator 13. Moreover, the thermal-marker detector 5 is configured to detect an arrival point of the thermal marker on the basis of a change in the absorbance of the laser beam at a specific wavelength that is detected by the photo diode 27 after being emitted from the semiconductor laser diode 25.

The tube 10 is preferably given a partly different tubular shape at a part thereof where the thermal-marker detector 5 is provided. Specifically, in this part of the tube 10, the partly different tubular shape causes the maximum thickness of the fluid layer flowing through the tube 10 to decrease in a direction in which the semiconductor laser diode 25 and the photo diode 27 face each other. In addition, this part of the tube 10 preferably forms a plane that is orthogonal to the incoming and outgoing direction of the laser beam so that a laser beam with a sufficient intensity can be transmitted to the photo diode 27. Accordingly, the laser beam emitted from the semiconductor laser diode 25 can be received by the photo diode 27 without being over-attenuated within the fluid.

Because the exterior of the tube 10 is made into flat parallel surfaces at a transmission point of the laser beam (referred to as a "laser-beam transmission point 26" hereinafter"), the light-receiving intensity of the photo diode 27 can be kept constant even when the transmission axis of the laser beam is slightly deviated from the center of the tube 10, as compared to when an ordinary hollow cylindrical tube is used. This is advantageous in that it provides extra allowance for positioning accuracy.

The operation of the flow-rate measuring device 1 having the above-described configuration will now be described.

First, the flow-rate measuring device 1 is installed on the tube 10 through which the fluid flows, and the microwave oscillator 9 of the thermal-marker generating unit 3 generates microwave pulses with a frequency of 2.45 GHz, which is commonly used in, for example, microwave ovens. The microwaves emitted from the microwave oscillator 9 are amplified at the power amplifier 11 and then impedance-matched at the impedance matcher 23. Subsequently, the microwaves are transmitted through the coaxial cable 15 so as to be applied to the thermal-marker generator 13.

The coaxial cable 15 is capable of transmitting up to about 200 W of power. Because a thermal marker can be generated by using the ordinary coaxial cable 15 instead of a waveguide used in a microwave heating device of the related art, the thermal-marker generating unit 3 can be reduced in size. In addition, with the use of the solid-state microwave oscillator 9, the microwaves can be applied in a freely-chosen pattern, including a pulse pattern, whereby thermal markers of various patterns can be generated.

Subsequently, in the thermal-marker generator 13, the microstrip line 17 irradiates the fluid flowing through the tube 10 with the microwaves transmitted by the coaxial cable 15. In consequence, a portion of the fluid is intensively and locally heated, thereby generating a thermal marker. For example, when microwaves of 10 W are to be applied, if the fluid is water, the temperature can be increased by about 10° C. by performing microwave pulse irradiation for less than or equal to one second. Accordingly, even if the distance between the thermal-marker generator 13 and the thermal-marker detector 5 is increased to about 10 cm, the thermal-marker detector 5 can satisfactorily detect the thermal marker, thereby increasing the measurable flow-rate range of the flow-rate measuring device 1.

In addition, since a microwave heating technique is used, the fluid hardly absorbs heat at the external surface thereof, unlike when generating a thermal marker using a laser beam; instead, the fluid can be heated at the interior thereof even if the fluid has a large cross-sectional area. This allows for the use of a thick tube, thereby increasing the measurable flow-rate range.

The tube 10 used for transferring the fluid is not limited to a common cylindrical tube, and may alternatively be a rectangular tube. In particular, the tube 10 to be fitted in the thermal-marker generator 13 may have a flat rectangular shape. In that case, the microstrip line 17 and the ground conductor 21 sandwich the flat rectangular tube by using the short sides of the flat rectangular tube between the microstrip line 17 and the ground conductor 21. This allows for enhancement of the fluid transferring performance that is equivalent to that when a thick cylindrical tube is used, and can also minimize the line length of the microstrip line 17, thereby achieving both an increased tube diameter and the generation of a clearly distinguishable thermal marker.

In a method that transmits microwaves or irradiates a fluid with microwaves by means of a waveguide commonly used in a microwave oven or a microwave heating device, it is possible to transmit a large amount of power. However, because the size of the waveguide is determined according to the frequency of the signal used, the size of the waveguide is limited. Therefore, in that case, the thermal-marker generating unit cannot be reduced in size.

In detail, when using a 2.45 GHz microwave signal commonly used in microwave ovens, the waveguide generally has internal dimensions of 109.22 mm×54.61 mm (Japanese Industrial Standards (JIS) WRJ-2). If a thermal marker is to be generated using the short sides of the waveguide having these dimensions, the waveguide is too large in size and is thus not suitable for generating a clearly distinguishable thermal marker. Although there is another standard waveguide called JIS WRT-2, a JIS WRT-2 waveguide still has dimensions of 27 mm×96 mm.

However, by using a flat rectangular waveguide, the thermal marker generation can be improved as compared to when an ordinary waveguide is used. For example, because a WFI-26 flat rectangular waveguide of Electronic Industries Association of Japan (EIAJ) standards has internal dimensions of 86.36 mm×10.4 mm, the microwave irradiation region can be reduced to 10.4 mm by using the short sides of the flat rectangular waveguide having these dimensions. However, the use of the microstrip line 17 according to the first embodiment is more advantageous in terms of size reduction of the thermal-marker generator 13 and the generation of a clearly distinguishable thermal marker.

In the thermal-marker detector 5, a laser beam is emitted from the semiconductor laser diode 25 and is received by the photo diode 27 after passing through the fluid in the tube 10. The photo diode 27 then detects a change in the absorbance of the laser beam at a specific wavelength. Since the absorbance of the laser beam changes according to a temperature change in the fluid, an arrival point of the thermal marker can be confirmed by detecting a point at which the absorbance changes.

Although the amount of laser light absorbed by the fluid is greatly affected by the thickness of the fluid layer through which the laser beam passes, because the part of the tube 10 where the laser-beam transmission point 26 is located is made narrower in the laser-beam transmission direction to reduce the thickness of the fluid layer, the photo diode 27 can receive a sufficient intensity of the laser beam. Consequently, the thermal-marker detector 5 is not affected by an increase in the diameter of the tube 10 at the thermal-marker generator 13 side, whereby the measurable flow-rate range can be effectively increased.

Since the distance between the thermal-marker generator 13 and the thermal-marker detector 5 and the cross-sectional area of the tube 10 are predetermined, the control system 7 can calculate and measure the flow rate of the fluid flowing through the tube 10 on the basis of the arrival time of the thermal marker detected by the thermal-marker detector 5.

As described above, in the flow-rate measuring method and the flow-rate measuring device 1 according to the first embodiment, a thermal marker is generated by intensively heating the fluid flowing through the tube 10 using microwaves, whereby the fluid can be heated from the outside of the tube 10, similar to when a laser beam is used. In addition, the fluid can be heated at the interior thereof without heat absorption at the external surface thereof, which can occur when using a laser beam. Consequently, a thermal marker that provides a large temperature difference in the fluid can be generated by a microwave output that is larger than that of the laser beam used in the related art.

Furthermore, in the flow-rate measuring method and the flow-rate measuring device 1 according to the first embodiment, since the fluid can be intensively and locally heated by irradiating it with the microwaves by using the microstrip line 17, a clearly distinguishable thermal marker can be generated. This facilitates the measurement of a change in the absorption of the laser beam, thereby further increasing the measurable flow-rate range. Moreover, the thermal-marker generator 13 can be made smaller in size as compared to when microwaves are output via a waveguide commonly used for microwave heating. In the related art, the distance between the thermal-marker generating unit and the thermal-marker detector is limited to about 10 mm, and the measurable flow-rate range is limited to about 10 ml/min. In contrast, according to the flow-rate measuring device 1, the distance that separates the thermal-marker generator 13 from the thermal-marker detector 5 is increased to about 10 cm, and the measurable flow-rate range is increased to about 100 ml/min.

The flow-rate measuring method and the flow-rate measuring device 1 according to the first embodiment can be modified as follows.

Figure 4A:
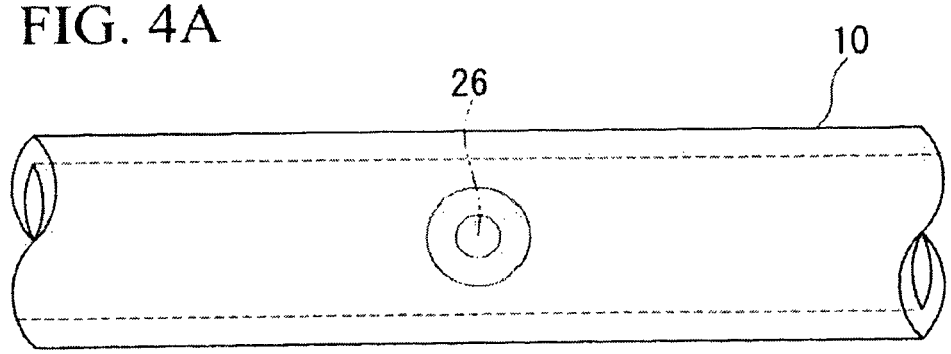
FIG. 4A illustrates a laser-beam transmission point of a tube according to a modification of the first embodiment of the present invention.
Figure 4B:
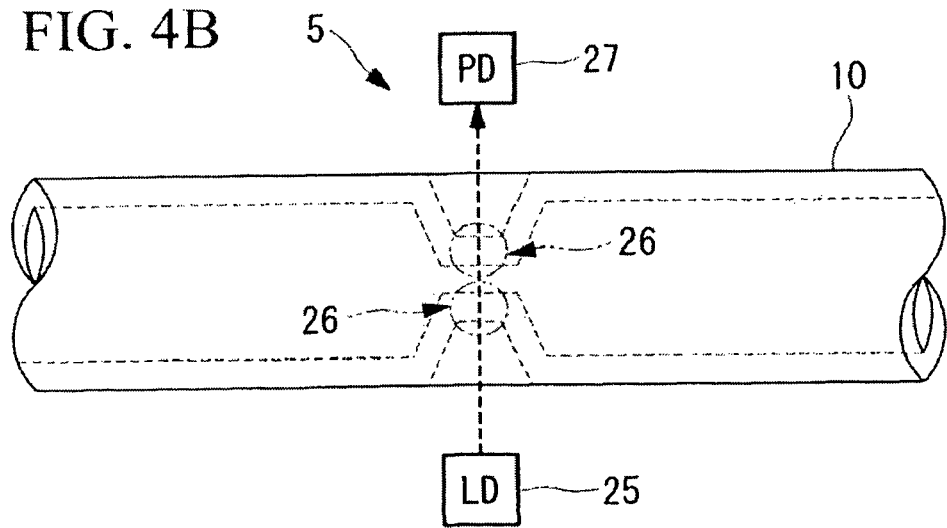
FIG. 4B is a schematic cross-sectional view of the laser-beam transmission point of the tube according to the modification of the first embodiment of the present invention.

For example, although the part of the tube 10 where the laser-beam transmission point 26 is located is evenly narrowed over the entire cross section in the first embodiment, as shown in FIG. 3, this part of the tube 10 where the laser-beam transmission point 26 is located may alternatively be formed such that only a submicroscopic region through which the laser beam passes is made narrow, as shown in FIGS. 4A and 4B. In other words, this part of the tube 10 may be formed such that the thickness of the tube 10 is reduced only in a circular region thereof whose diameter is slightly larger than the beam diameter of the laser beam. Accordingly, the tube 10 can have a large inner diameter over a greater length, thereby increasing the measurable flow-rate range.

Second Embodiment

A flow-rate measuring method and a flow-rate measuring device according to a second embodiment of the present invention will now be described with reference to FIGS. 5A and 5B.

A flow-rate measuring device 101 according to the second embodiment differs from that in the first embodiment in that a thermal-marker generator 113 is equipped with a coaxial line (transmission line) 107 in place of the microstrip line 17.

Components that are similar to those in the flow-rate measuring device 1 according to the first embodiment are given the same reference numerals, and descriptions thereof will be omitted.

Figure 5A:
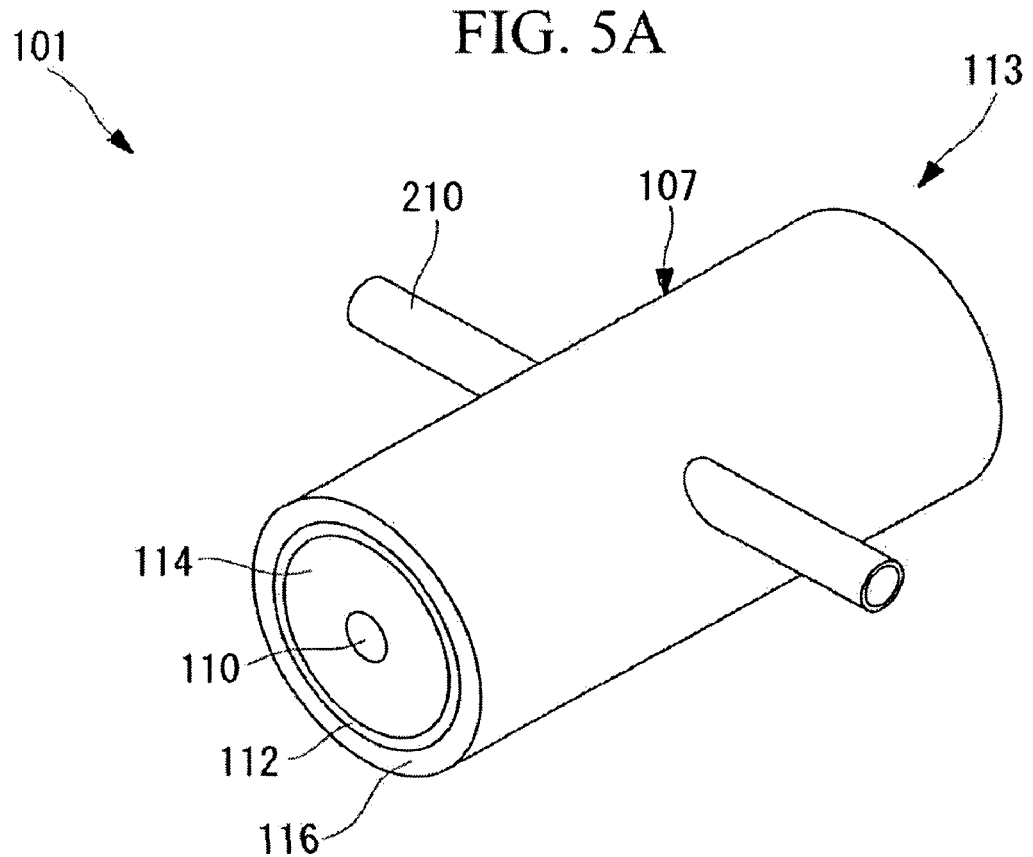
FIG. 5A is an overall view of a thermal-marker generator of a flow-rate measuring device according to a second embodiment of the present invention.
Figure 5B:
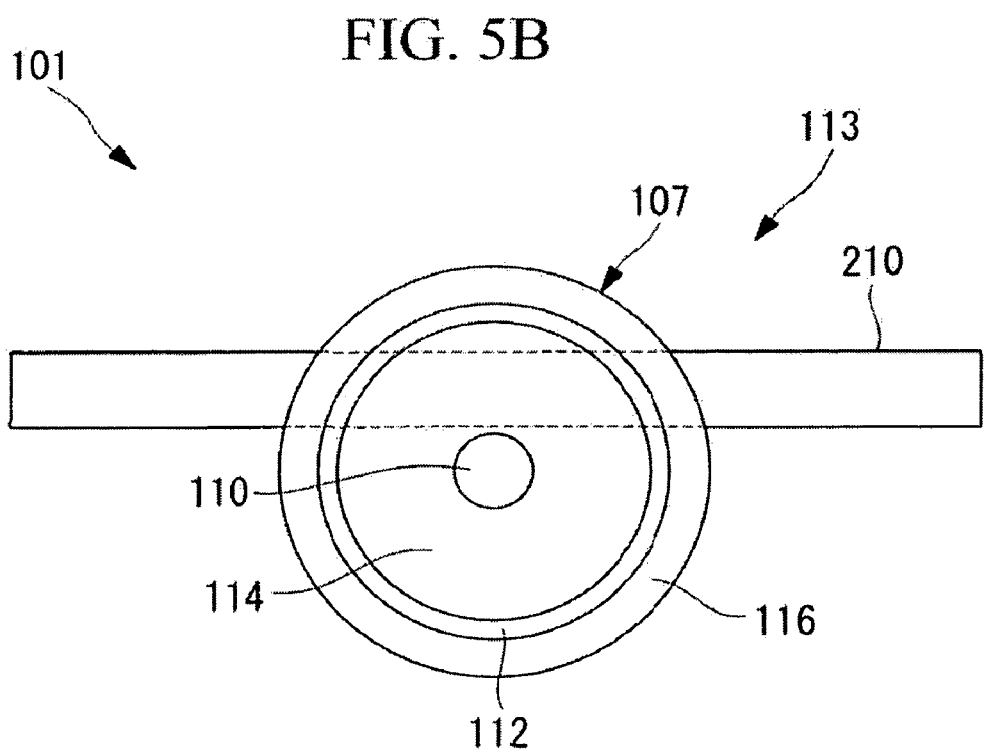
FIG. 5B is a cross-sectional view of a part of a coaxial line of the thermal-marker generator shown in FIG. 5A where a fluoroplastic tube extends.

In this embodiment shown in FIGS. 5A and 5B, the coaxial line 107 has an opening through which a fluoroplastic tube 210 extends. FIG. 5A illustrates the entire thermal-marker generator 113, and FIG. 5B is a cross-sectional view of a part of the coaxial line 107 where the fluoroplastic tube 210 extends. The coaxial line 107 has the same configuration as an ordinary coaxial cable, and includes a center conductor 110 that transmits microwaves, a cylindrical external conductor 112 that concentrically surrounds the center conductor 110, a coaxial-line dielectric member 114 provided between the center conductor 110 and the external conductor 112, and an external protective coating 116 that covers the periphery of the external conductor 112. The coaxial line 107 has a terminator (not shown) attached to a terminal thereof in the microwave transmission direction.

With the coaxial line 107 having this configuration, the present invention can be applied to a tube having an outer diameter that is smaller than or equivalent to the thickness of the coaxial-line dielectric member 114 between the center conductor 110 and the external conductor 112. In particular, the present invention is effective when applied to a microflow meter that uses a tube having an outer diameter of 1 mm or smaller.

Third Embodiment

A flow-rate measuring method and a flow-rate measuring device according to a third embodiment of the present invention will now be described.

Figure 6:
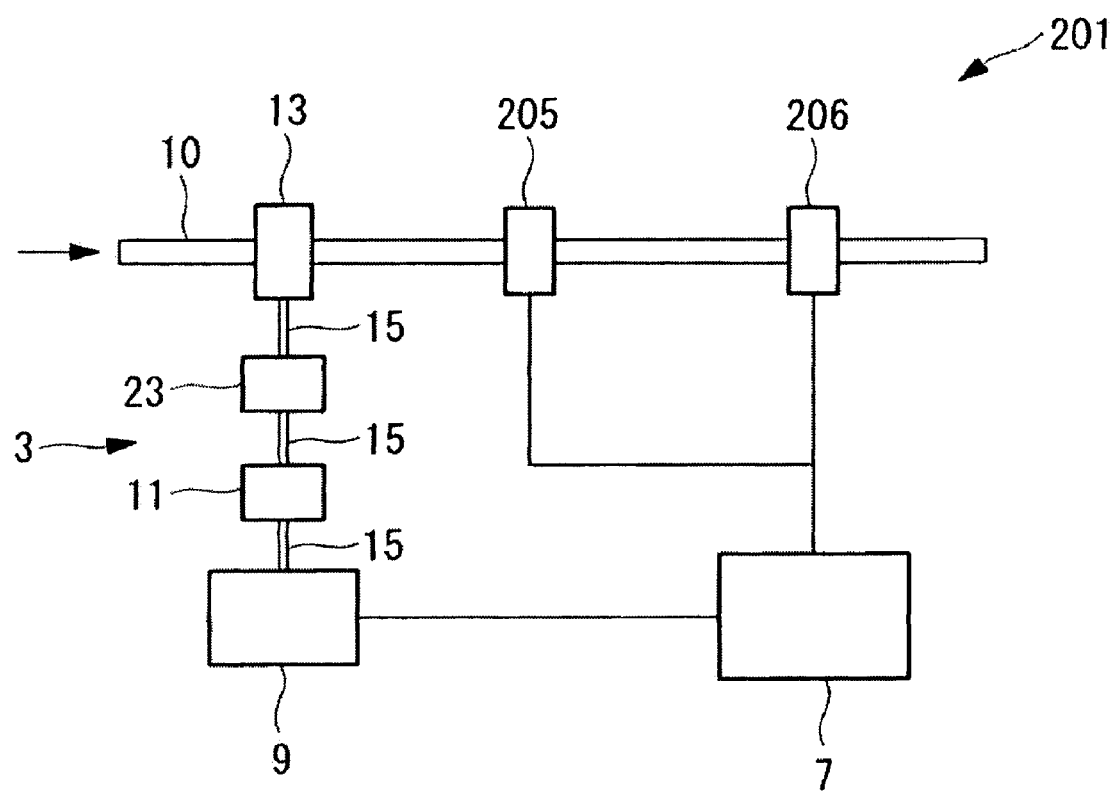
FIG. 6 is a schematic view of thermal-marker detectors of a flow-rate measuring device according to a third embodiment of the present invention.

Referring to FIG. 6, a flow-rate measuring device 201 according to the third embodiment differs from that in the first embodiment in that it includes a first thermal-marker detector 205 and a second thermal-marker detector 206.

Components that are similar to those in the flow-rate measuring device 1 according to the first embodiment are given the same reference numerals, and descriptions thereof will be omitted.

In the flow-rate measuring device 201 according to the third embodiment, the first thermal-marker detector 205 checks the thermal marker pattern immediately after being generated by the thermal-marker generator 13, and the flow rate of the fluid is measured based on the time that it takes the checked thermal marker pattern to reach the second thermal-marker detector 206. Specifically, the first thermal-marker detector 205 is disposed downstream of the thermal-marker generator 13 and is configured to preliminarily measure the thermal marker pattern. The second thermal-marker detector 206 is disposed downstream of the first thermal-marker detector 205 and is configured to accurately detect a peak point of the thermal marker measured by the first thermal-marker detector 205.

In the third embodiment, the flow rate of the fluid may be measured on the basis of the distance between the first thermal-marker detector 205 and the second thermal-marker detector 206, a time period between a point at which the peak point of the thermal marker is measured by the first thermal-marker detector 205 and a point at which the peak point of the thermal marker is detected by the second thermal-marker detector 206, and the cross-sectional area of the tube 10. In consequence, the effect the line width of the microstrip line 17 has on the measurement error can be reduced as much as possible, thereby allowing for a more accurate measurement of the flow rate.

Although the embodiments of the present invention have been described above in detail with reference to the drawings, the specific configurations are not limited to those in the above embodiments and may include other design modifications so long as they do not depart from the scope of the invention.

What is claimed is:

1. A flow-rate measuring method for measuring a flow rate of a fluid inside a tube by using a heating unit that heats the fluid flowing through the tube from the outside thereof so as to generate a heated portion in the fluid inside the tube and a detecting unit disposed downstream of the heating unit and configured to detect the heated portion, generated by the heating unit, of the fluid inside the tube, the flow rate being measured on the basis of a distance between the heating unit and the detecting unit, a time period between a point at which the heated portion of the fluid inside the tube is generated by the heating unit and a point at which the heated portion is detected by the detecting unit, and a cross-sectional area of the tube, wherein the heating unit heats the fluid by a microwave heating technique, and microwaves are applied to the fluid by using a transmission line, the heating unit includes a microstrip line as the transmission line, a ground conductor, and a dielectric member interposed between the microstrip line and the ground conductor, the tube extends through the dielectric member, and the microstrip line is disposed on the surface of the dielectric member so as to extend crosswise to the longitudinal direction of the tube.

2. The flow-rate measuring method according to claim 1, wherein the detecting unit detects the heated portion on the basis of a change in absorbance of detection light at a predetermined wavelength caused by a temperature change in the fluid.

3. The flow-rate measuring method according to claim 2, wherein the tube has a partly different tubular shape at a part where the detecting unit is disposed, the partly different tubular shape being made to cause a thickness of the fluid inside the tube to decrease at a portion through which the detection light of the predetermined wavelength passes, relative to a portion upstream of the portion through which the detection light of the predetermined wavelength passes.

4. The flow-rate measuring method according to claim 2, wherein a laser beam emitted from a semiconductor laser diode is used as a source of the detection light at the predetermined wavelength for the detecting unit, and a photo diode that detects a light intensity of the laser beam is provided.

5. A flow-rate measuring device for measuring a flow rate of a fluid inside a tube, comprising a heating unit that heats the fluid flowing through the tube from the outside thereof so as to generate a heated portion in the fluid inside the tube; and a detecting unit disposed downstream of the heating unit and configured to detect the heated portion, generated by the heating unit, of the fluid inside the tube, the flow-rate measuring device measuring the flow rate on the basis of a distance between the heating unit and the detecting unit, a time period between a point at which the heated portion of the fluid inside the tube is generated by the heating unit and a point at which the heated portion is detected by the detecting unit, and a cross-sectional area of the tube, wherein the heating unit heats the fluid by a microwave heating technique, and microwaves are applied to the fluid by using a transmission line, the heating unit includes a microstrip line as the transmission line, a ground conductor, and a dielectric member interposed between the microstrip line and the ground conductor, the tube extends through the dielectric member, and the microstrip line on the top surface of the dielectric member so as to extend crosswise to the tube.

6. The flow-rate measuring device according to claim 5, wherein the detecting unit detects the heated portion on the basis of a change in absorbance of detection light at a predetermined wavelength caused by a temperature change in the fluid.

7. The flow-rate measuring device according to claim 6, wherein the tube has a partly different tubular shape at a part where the detecting unit is disposed, the partly different tubular shape being made to cause a thickness of the fluid inside the tube to decrease at a portion through which the detection light of the predetermined wavelength passes, relative to a portion upstream of the portion through which the detection light of the predetermined wavelength passes.

8. The flow-rate measuring device according to claim 6, wherein a laser beam emitted from a semiconductor laser diode is used as a source of the detection light at the predetermined wavelength for the detecting unit, and a photo diode that detects a light intensity of the laser beam is provided.

9. The flow-rate measuring method according to claim 1, wherein the microstrip line has a line width of 2 mm to 6 mm.

10. The flow-rate measuring method according to claim 1, wherein the tube has an inner diameter of 1 mm to 4 mm.

11. The flow-rate measuring device according to claim 5, wherein the microstrip line has a line width of 2 mm to 6 mm.

12. The flow-rate measuring device according to claim 5, wherein the tube has an inner diameter of 1 mm to 4 mm.

13. A flow-rate measuring method for measuring a flow rate of a fluid inside a tube by using a heating unit that heats the fluid flowing through the tube from the outside thereof so as to generate a heated portion in the fluid inside the tube and a detecting unit disposed downstream of the heating unit and configured to detect the heated portion, generated by the heating unit, of the fluid inside the tube, the flow rate being measured on the basis of a distance between the heating unit and the detecting unit, a time period between a point at which the heated portion of the fluid inside the tube is generated by the heating unit and a point at which the heated portion is detected by the detecting unit, and a cross-sectional area of the tube, wherein the heating unit heats the fluid by a microwave heating technique, and microwaves are applied to the fluid by using a coaxial line, the coaxial line includes a center conductor that transmits microwaves, an external conductor that concentrically surrounds the center conductor, and a dielectric member provided between the center conductor and the external conductor, the tube extends through the dielectric member, and the center conductor is disposed so as to extend crosswise to the longitudinal direction of the tube.

14. The flow-rate measuring method according to claim 13, wherein the detecting unit detects the heated portion on the basis of a change in absorbance of detection light at a predetermined wavelength caused by a temperature change in the fluid.

15. The flow-rate measuring method according to claim 14, wherein the tube has a partly different tubular shape at a part where the detecting unit is disposed, the partly different tubular shape being made to cause a thickness of the fluid inside the tube to decrease at a portion through which the detection light of the predetermined wavelength passes, relative to a portion upstream of the portion through which the detection light of the predetermined wavelength passes.

16. The flow-rate measuring method according to claim 14, wherein a laser beam emitted from a semiconductor laser diode is used as a source of the detection light at the predetermined wavelength for the detecting unit, and a photo diode that detects a light intensity of the laser beam is provided.

17. A flow-rate measuring device for measuring a flow rate of a fluid inside a tube, comprising a heating unit that heats the fluid flowing through the tube from the outside thereof so as to generate a heated portion in the fluid inside the tube; and a detecting unit disposed downstream of the heating unit and configured to detect the heated portion, generated by the heating unit, of the fluid inside the tube, the flow-rate measuring device measuring the flow rate on the basis of a distance between the heating unit and the detecting unit, a time period between a point at which the heated portion of the fluid inside the tube is generated by the heating unit and a point at which the heated portion is detected by the detecting unit, and a cross-sectional area of the tube, wherein the heating unit heats the fluid by a microwave heating technique, and microwaves are applied to the fluid by using a coaxial line, the coaxial line includes a center conductor that transmits microwaves, an external conductor that concentrically surrounds the center conductor, and a dielectric member provided between the center conductor and the external conductor, the tube extends through the dielectric member, and the center conductor is disposed so as to extend crosswise to the longitudinal direction of the tube.

18. The flow-rate measuring device according to claim 17, wherein the detecting unit detects the heated portion on the basis of a change in absorbance of detection light at a predetermined wavelength caused by a temperature change in the fluid.

19. The flow-rate measuring device according to claim 18, wherein the tube has a partly different tubular shape at a part where the detecting unit is disposed, the partly different tubular shape being made to cause a thickness of the fluid inside the tube to decrease at a portion through which the detection light of the predetermined wavelength passes, relative to a portion upstream of the portion through which the detection light of the predetermined wavelength passes.

20. The flow-rate measuring device according to claim 18, wherein a laser beam emitted from a semiconductor laser diode is used as a source of the detection light at the predetermined wavelength for the detecting unit, and a photo diode that detects a light intensity of the laser beam is provided.

\* \* \* \* \*